US012123961B2

(12) United States Patent
Hsu et al.

(10) Patent No.: US 12,123,961 B2
(45) Date of Patent: Oct. 22, 2024

(54) 3D LIDAR AIDED GLOBAL NAVIGATION SATELLITE SYSTEM AND THE METHOD FOR NON-LINE-OF-SIGHT DETECTION AND CORRECTION

(71) Applicant: THE HONG KONG POLYTECHNIC UNIVERSITY, Hong Kong (CN)

(72) Inventors: Li-ta Hsu, Hong Kong (CN); Weisong Wen, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 284 days.

(21) Appl. No.: 17/659,200

(22) Filed: Apr. 14, 2022

(65) Prior Publication Data

US 2023/0033404 A1 Feb. 2, 2023

Related U.S. Application Data

(60) Provisional application No. 63/203,760, filed on Jul. 30, 2021.

(51) Int. Cl.
*G01S 19/44* (2010.01)
*G01S 17/93* (2020.01)
(Continued)

(52) U.S. Cl.
CPC ............ *G01S 19/44* (2013.01); *G01S 17/931* (2020.01); *G01S 19/45* (2013.01)

(58) Field of Classification Search
CPC ......... G01S 19/44; G01S 19/45; G01S 17/931
(Continued)

(56) References Cited

U.S. PATENT DOCUMENTS 11,585,662 B2 * 2/2023 Zhang ................ G01C 21/1652
2021/0302597 A1 * 9/2021 Rezaei ..................... G01S 19/51

FOREIGN PATENT DOCUMENTS

CA 3036928 C * 3/2022 .............. G01S 19/11

OTHER PUBLICATIONS

Chiang et al.; Navigation engine design for automated driving using INS/GNSS/3D LiDAR-SLAM and integrity assessment; Remote Sensing; 2020; 12; 1564; doi:10.3390/rs12101564.

* cited by examiner

*Primary Examiner* — Harry K Liu
(74) *Attorney, Agent, or Firm* — S&F/WEHRW (57) ABSTRACT

A method for supporting positioning of a vehicle using a satellite positioning system is disclosed. The method includes generating, in real-time, a sliding window map (SWM) based on 3D point clouds from a 3D LiDAR sensor and an attitude and heading reference system (AHRS), wherein the SWM provides an environment description for detecting and correcting a non-line-of-sight (NLOS) reception; accumulating the 3D point clouds from previous frames into the SWM for enhancing a field of view (FOV) of the 3D LiDAR sensor; receiving global navigation satellite system (GNSS) measurements from satellites, by a GNSS receiver; detecting NLOS reception from the GNSS measurements using the SWM; correcting the NLOS reception by NLOS remodeling when a reflection point is not found in the SWM; and estimating a GNSS positioning by a least-squares algorithm. It is the objective to provide a method that mitigates NLOS caused by both static buildings and dynamic objects.

20 Claims, 8 Drawing Sheets

(51) Int. Cl.
*G01S 17/931* (2020.01)
*G01S 19/45* (2010.01)
(58) Field of Classification Search
USPC .................................................. 342/357.27
See application file for complete search history.

FIG. 8

3D LIDAR AIDED GLOBAL NAVIGATION SATELLITE SYSTEM AND THE METHOD FOR NON-LINE-OF-SIGHT DETECTION AND CORRECTION

CROSS-REFERENCE TO RELATED APPLICATIONS

This application claims the benefit of U.S. Provisional Patent Application No. 63/203,760, filed on Jul. 30, 2021, which is incorporated by reference herein in its entirety.

PRIOR DISCLOSURES BY THE INVENTORS OR JOINT INVENTORS

Part of the present invention was disclosed in a conference proceeding for the 34th International Technical Meeting of the Satellite Division of the Institute of Navigation, ION GNSS+2021, published on Sep. 20, 2021. Part of the present invention was also disclosed in a paper submitted to the arXiv preprint, arXiv: 2112.06108 on Dec. 12, 2021. Both papers are grace period inventor-originated disclosures disclosed within one year before the effective filing date of this application. Copies of the articles are provided on the Information Disclosure Statement.

LIST OF ABBREVIATIONS

| | |
|---|---|
| 3D | three dimensional |
| 3DMA | 3D mapping aided |
| ADAS | advanced driver assistance system |
| ADV | autonomous driving vehicle |
| AHRS | attitude and heading reference system |
| DOP | dilution of precision |
| ECEF | Earth-centered Earth-fixed |
| ENU | east, north, and up |
| FOV | field of view |
| GNSS | global navigation satellite system |
| GNSS-RTK | global navigation satellite system real-time kinematic |
| GPS | Global positioning system |
| LiDAR | light detection and ranging |
| LIO | LiDAR-inertial odometry |
| IMU | inertial measurement unit |
| LOS | line-of-sight |
| NLOS | none-line-of-sight |
| PCM | point cloud map |
| ROS | robotic operation system |
| RTK | real-time kinematic |
| SLAM | simultaneous localization, and mapping |
| SWM | sliding window map |
| t | GNSS epoch |
| G | ECEF frame |
| L | ENU frame |
| s | Index of satellite |
| r | GNSS receiver |
| BI | AHRS body frame |
| BL | LiDAR body frame |
| BR | GNSS receiver body frame |
| $\rho$ | Pseudorange |
| $\rho_{r,t}^s$ | Pseudorange of satellite s at epoch t |
| $P_t^{G,s}$ | Position of satellite s at epoch t |
| $P_{r,t}^G$ | Position of satellite GNSS receiver at epoch t |
| $\delta_{r,t}$ | Clock bias of GNSS receiver |
| $\delta_{r,t}^s$ | Clock bias of satellite |
| $\Psi_{r,t}^s$ | Signal to noise ratio (SNR) |
| $K_w$ | Scaling factor for weightings |
| $\varepsilon_{r,t}^s$ | Satellite elevation angle |
| $\alpha_{r,t}^s$ | Satellite azimuth angle |
| k | Index of the search point |
| $N_k$ | Number of neighboring points |

FIELD OF THE INVENTION

The present disclosure generally relates to the field of autonomous driving or other kinds of autonomous systems for intelligent transportation systems. In particular, the present disclosure relates to a 3D LiDAR aided global navigation satellite system and the method for NLOS detection and correction, that can improve the positioning performance.

BACKGROUND OF THE INVENTION

Autonomous driving is well believed to be the remedy of excessive traffic congestion and expected accidents. However, the insufficient positioning accuracy of the current solution is one of the key problems preventing the arrival of autonomous driving in urban scenarios. With the increasing demand for ADV, positioning in urban environments becomes essential.

GNSS, such as GPS and/or other similar satellite-based positioning technologies, is currently one of the principal means of providing global-referenced positioning for ADV localization for intelligent transportation systems. With the increased availability of multiple satellite constellations, GNSS can provide satisfactory performance in open-sky areas. However, the performance of GNSS severely degrades when large parts of the sky are obstructed, which is a challenging problem. Such a situation is called the "urban canyon" scenario. Generally, the positioning accuracy is significantly degraded in highly-urbanized cities due to the signal reflection caused by static buildings and dynamic objects.

In particular, the GNSS-RTK is used for high precision aerial mapping and positioning for level-4 fully autonomous driving vehicles. Typically, the GNSS-RTK positioning involves two steps: (1) estimating the float solution based on the received GNSS measurements; and (2) resolving the integer ambiguity using least-squares algorithms (e.g., LAMBDA) based on the derived float solution as an initial guess. Centimeter-level positioning accuracy can be achieved based on the double-differential carrier and code measurements in the open area when the fixed solution is achieved. Unfortunately, the accuracy of GNSS-RTK is significantly degraded in urban canyons due to the NLOS and multipath receptions caused by GNSS signal reflection and blockage from surrounding buildings. In practice, the significantly degraded GNSS-RTK positioning accuracy in urban canyons is mainly led by the occurrence of GNSS NLOS reception. Because of the NLOS reception, the performance of GNSS positioning is highly influenced by real-time surrounding environmental features, such as buildings and dynamic objects. Part of the received GNSS signals is significantly polluted involving large noise. According to the inventors' previous research, the majority of the received GNSS signals can be multipath or NLOS reception in highly urbanized areas. Therefore, the accuracy of the float solution estimation based on the differential carrier and code measurements is degraded, making the ambiguity resolution hard to get a fixed solution.

Furthermore, the number of available satellites is limited in urban canyons due to the signal blockage from surrounding buildings. Therefore, the geometry of the satellite distribution is distorted leading to a large DOP. As a result, the fixed solution is hard to be obtained due to the poorer satellite geometry and larger ambiguity in searching space. In short, the urban canyon scenario introduces additional difficulties to both steps of GNSS-RTK positioning.

Therefore, effectively sensing and understanding surrounding environments is the key to improving GNSS positioning in urban areas, as GNSS positioning relies heavily on sky view visibility. The most well-known method to cope with the GNSS NLOS reception is the 3DMA GNSS positioning, such as the NLOS exclusion based on 3D mapping information, and shadow matching. However, these 3DMA GNSS methods had the drawbacks of 1) reliance on the availability of 3D building models and the initial guess of the GNSS receiver's position; and 2) the inability to mitigate NLOS reception caused by surrounding dynamic objects. The recent progress of the 3DMA GNSS positioning methods was detailly reviewed in the inventors' previous work.

In the recent publication by the inventors, 3D LiDAR sensors, the so-called "eyes" of ADV, the typical indispensable onboard sensor for autonomous driving vehicles, had been employed to detect NLOS caused by dynamic objects. Due to the limited FOV of −30°~+10° of the 3D LiDAR, only part of a double-decker bus can be scanned. Moreover, the method relies heavily on the accuracy of object detection. Nonetheless, this was the first work employing real-time object detection to assist the GNSS positioning. Instead of only detecting dynamic objects, the detection of surrounding buildings using real-time 3D LiDAR point clouds was explored. Due to the limited field of view of 3D LiDAR, only part of the buildings can be scanned. Therefore, information about building height was required to detect the NLOS reception caused by the buildings. Instead of excluding the detected NLOS receptions, the inventors explored alternatives for correcting the NLOS pseudorange measurements with the help of LiDAR. The 3D LiDAR can measure the distance from the GNSS receiver to the surface of a building that may have reflected the GNSS signal. Then the corrected and the remaining healthy GNSS measurements can both be used in further GNSS positioning. The improved performance was obtained after correcting the detected NLOS satellites. Unfortunately, the performance of this approach relies on the accuracy of the detection of buildings and reflectors. Both building detection and reflector detection can fail when a building surface is highly irregular. The limited FOV of LiDAR remains a drawback in the detection of both dynamic objects and buildings. Overall, previous work shows the feasibility of detecting GNSS NLOS using real-time onboard sensing: the real-time point clouds. To overcome the drawback of the limited FOV of 3D LiDAR, the inventors explored the use of both fish-eye cameras and 3D LiDAR to detect and correct NLOS signals. The fish-eye camera was applied to detect NLOS signals. Meanwhile, the 3D LiDAR was employed to measure the distance between the GNSS receiver and a potential reflector causing NLOS signals. However, this approach has the problem that the NLOS detection was sensitive to the environmental illumination conditions.

Accordingly, there is a need in the art to have an improved positioning method and system, particularly for autonomous driving that can achieve high precision positioning in a very deep urban canyon. Furthermore, other desirable features and characteristics will become apparent from the subsequent detailed description and the appended claims, taken in conjunction with the accompanying drawings and this background of the disclosure.

SUMMARY OF THE INVENTION

Provided herein is a 3D LiDAR aided GNSS NLOS mitigation method and the system implementing the same. It is the objective of the present disclosure to provide a method that mitigates NLOS caused by both static buildings and dynamic objects.

In the first aspect of the disclosure, there is provided a method for supporting positioning of a vehicle using a satellite positioning system is disclosed. The method includes receiving a LiDAR factor and an IMU factor, from a 3D LiDAR sensor and a LIO; integrating the LiDAR factor and the IMU factor using a local factor graph optimization for estimating a relative motion between two epochs; generating a 3D PCM as an auxiliary landmark satellite for providing a low elevation auxiliary landmark satellite; receiving GNSS measurements from satellites, by a GNSS receiver; detecting a GNSS NLOS reception from the GNSS measurements using the 3D PCM; and excluding the GNSS NLOS reception from the GNSS measurements to obtain survived GNSS satellite measurements for enhancing GNSS measurement quality for the positioning of the autonomous driving vehicle.

In an embodiment, the method further includes performing a GNSS-RTK float estimation on the survived GNSS satellite measurements to obtain a float solution; performing an ambiguity resolution to obtain a fixed ambiguity solution; and determining a fixed GNSS-RTK positioning solution from the float solution and the fixed ambiguity solution.

In an embodiment, the ambiguity resolution is performed by applying a LAMBDA algorithm.

In an embodiment, the method further includes feedbacking the fixed GNSS-RTK positioning solution to the 3D LiDAR sensor and the LIO; and performing PCM correction using the fixed GNSS-RTK positioning solution for correcting a drift of 3D point clouds.

In an embodiment, the method further includes obtaining an initial guess of the float solution using least-squares algorithms on the GNSS measurements.

In the second aspect of the disclosure, there is provided a method for supporting positioning of a vehicle using a satellite positioning system is disclosed. The method includes generating, in real-time, an SWM based on 3D point clouds from a 3D LiDAR sensor and an AHRS, wherein the SWM provides an environment description for detecting and correcting an NLOS reception; accumulating the 3D point clouds from previous frames into the SWM for enhancing a FOV of the 3D LiDAR sensor; receiving GNSS measurements from satellites, by a GNSS receiver; detecting NLOS reception from the GNSS measurements using the SWM; correcting the NLOS reception by NLOS remodeling when a reflection point is not found in the SWM; and estimating a GNSS positioning by a least-squares algorithm.

In an embodiment, the method further includes minimizing a magnitude of draft of the SWM by excluding point clouds far away from the GNSS receiver, such that the 3D point clouds are inside a sliding window.

In an embodiment, the step of generating the SWM includes obtaining a local map from a LiDAR scan-matching based on the 3D point clouds from the 3D LiDAR sensor; and adopting an orientation from the AHRS to transform the SWM from a body frame to a local East North Up (ENU) frame.

In an embodiment, the step of detecting the NLOS reception from the GNSS measurements is performed using a fast-searching method, wherein the fast-searching method includes initializing a search point at a center of the 3D LiDAR sensor; determining a search direction connecting the GNSS receiver and a satellite based on an elevation angle and an azimuth angle of the satellite; moving the search point along the search direction with a fixed incremental value $\Delta d_{pix}$; counting a number of neighboring points ($N_k$) near the search point; and classifying the search point as an NLOS satellite if $N_k$ exceeds a predetermined threshold $N_{thres}$.

In an embodiment, the method further includes correcting the NLOS reception by re-estimating the GNSS measurement using a model calibration based on the SWM. The SWM provides the 3D point clouds that are dense, discrete, and unorganized without continuous building surfaces or boundaries.

In an embodiment, the model calibration includes detecting a reflection point corresponding to the NLOS reception using an efficient kdTree structure based on a reflector detection algorithm. The reflector detection algorithm includes traversing all the azimuths from 0° to 360° with an azimuth resolution of $\alpha_{res}$ and an elevation angle of $\epsilon_{r,t}^{s}$; detecting a potential reflector when a line-of-sight connecting the point $p_j$ and a satellite is not blocked; and detecting a unique reflector with a shortest distance between the GNSS receiver and the potential reflectors.

In an embodiment, the NLOS remodeling is performed using a weighting scheme with a scaling factor. The scaling factor is used to de-weight the NLOS reception. The weighting scheme includes a determination that, if a satellite is classified as a LOS measurement, the scaling factor is calculated based on a satellite signal to noise ratio (SNR) and an elevation angle; if the satellite is classified as an NLOS measurement and a pseudorange error is corrected, the scaling factor is calculated based on the satellite SNR and the elevation angle; and if the satellite is classified as an NLOS measurement but the reflection point is not detected, the scaling factor is calculated based on the satellite SNR, the elevation angle and a scaling factor $K_w$.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects and advantages of the present invention are disclosed as illustrated by the embodiments hereinafter.

BRIEF DESCRIPTION OF THE DRAWINGS

The appended drawings contain figures to further illustrate and clarify the above and other aspects, advantages, and features of the present disclosure. It will be appreciated that these drawings depict only certain embodiments of the present disclosure and are not intended to limit its scope. It will also be appreciated that these drawings are illustrated for simplicity and clarity and have not necessarily been depicted to scale. The present disclosure will now be described and explained with additional specificity and detail through the use of the accompanying drawings in which.

DETAILED DESCRIPTION OF THE INVENTION

The present disclosure generally provides to the field of autonomous driving or other kinds of autonomous systems with navigation requirements using a satellite positioning system. The vehicle may be an ADV, or a vehicle equipped with an ADAS. More specifically, but without limitation, the present disclosure provides a 3D LiDAR aided GNSS NLOS mitigation method that can detect and correct NLOS signals in a very deep urban canyon, and the system implements the same. It is the objective of the present disclosure to provide a method that mitigates NLOS caused by both static buildings and dynamic objects, thereby achieving high precision in highly dense urbanized areas.

The benefits, advantages, solutions to problems, and any element(s) that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims as issued.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

As used herein, the term "global navigation satellite system" or "GNSS" refers to a generic satellite assisted navigation system in which electronic receivers can determine their location with specified accuracy using line-of-sight radio signals transmitted by satellites. Signals from multiple satellites orbiting the Earth may be received and processed by a GNSS receiver to determine the location of the GNSS receiver and, by proxy, the location of the vehicle. For the purpose of the present disclosure, unless otherwise specified, the state of the GNSS receiver and the position of satellites are all expressed in the ECEF frame.

The term "LiDAR sensor" refers to a sensor capable of measuring the distance from the vehicle to an object by transmitting a laser beam to the object and measuring the reflected portions of the laser beam in order to calculate the distance.

The term "attitude and heading reference system" or "AHRS" refers to a system having one or more sensors configured to use vibrations to measure changes in direction, orientation, and/or acceleration of the vehicle based on a vertical reference.

The first embodiment of the present disclosure is to detect and exclude the GNSS NLOS reception to further improve the GNSS-RTK positioning. Meanwhile, it is also significant to adopt the improved GNSS-RTK positioning to correct the drift of the 3D point clouds, and therefore, improve the overall positioning accuracy.

Figure 1:
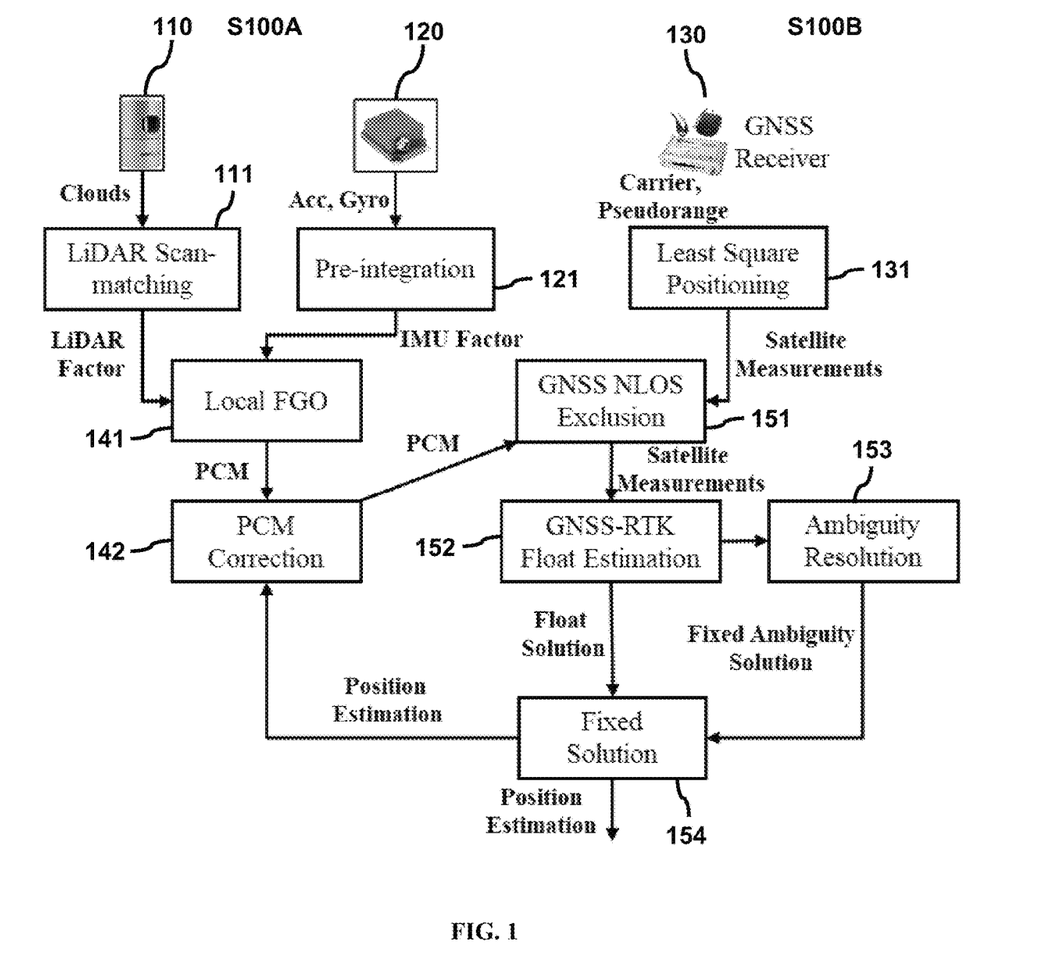
FIG. 1 is an overview of the 3D LiDAR aided GNSS real-time kinematic positioning method in accordance with an exemplary embodiment of the present disclosure.

FIG. 1 provides an overview of the 3D LiDAR aided GNSS-RTK positioning method proposed in the present disclosure. The system comprises two parts: (1) the real-time environment description generation based on clouds from a 3D LiDAR and an IMU, together with the correction from the GNSS-RTK solution S100A; and (2) the GNSS NLOS detection and exclusion based on the real-time environment description, and the GNSS-RTK positioning based on surviving satellites S100B.

In certain embodiments, the GNSS-RTK positioning in urban canyons is improved using a 3D LiDAR sensor 110 by essentially tackling the problem of the conventional GNSS-RTK due to the signal reflections and the blockage. Firstly, the 3D LiDAR sensor 110 and an LIO 120, which receives and loosely integrates a LiDAR factor and an IMU factor using a local factor graph optimization 141, is performed to estimate the relative motion between two epochs and generate the 3D PCM for providing an environment description. The LiDAR factor is obtained from the LiDAR scan-matching 111, and the IMU factor is obtained from pre-integration 121. The environment description used herein is a local environment description. In certain embodiments, the 3D LiDAR sensor 110 is the Velodyne 32 configured to collect raw 3D point cloud data at a frequency of 10 Hz, and the LIO 120 is the Xsens Ti-10 IMU configured to collect data at a frequency of 100 Hz. Meanwhile, the position of the surrounding point clouds is estimated simultaneously. Therefore, the PCM correction 142 is performed by using the position estimation of the surrounding point clouds on the 3D PCM. The effect is that this method can advantageously generate a locally accurate PCM.

Secondly, the potential GNSS NLOS satellites are detected and excluded with the help of the environment description. The GNSS receiver 130 receives the GNSS measurements from satellites, which may use the conventional least-squares algorithms 131 to derive an initial guess of a float solution. In certain embodiments, the GNSS receiver 130 is a commercial-level u-blox F9P GNSS receiver that was used to collect raw GPS/BeiDou measurements at a data frequency of 1 Hz. Besides, the NovAtel SPAN-CPT, a GNSS (GPS, GLONASS, and Beidou) RTK/INS (fiber-optic gyroscopes, FOG) integrated navigation system may be used to provide ground truth of positioning. All the data are collected and synchronized using a ROS.

For the subsequent GNSS NLOS detection, the first embodiment of the present disclosure does not rely on the initial guess of the float solution of the GNSS receiver 130. Instead, the GNSS NLOS reception is detected from the GNSS measurements using 3D PCM generated by LiDAR or inertial integration with the associated algorithm. Therefore, the problem of poor GNSS measurement quality is alleviated using GNSS NLOS exclusion 151, which essentially excludes the potential GNSS NLOS reception to obtain survived GNSS satellite measurements.

To solve this problem, the present disclosure proposes to adopt the landmark from the generated point cloud map as an "auxiliary landmark satellite" to essentially improve the satellite geometry. Advantageously, the auxiliary landmark satellite and the received satellite are complementary as point cloud maps, which can provide the low elevation auxiliary landmark satellite. Such low elevation auxiliary landmark satellite is usually unavailable for the physically received satellite. To this end, the polluted GNSS NLOS satellites are excluded and the satellite geometry is improved with the help of the auxiliary landmark satellite.

Next, the float solution can be estimated based on the survived GNSS satellite measurements by performing GNSS-RTK float estimation 152 to obtain a float solution, followed by an ambiguity resolution 153 to obtain a fixed ambiguity solution. In certain embodiments, the ambiguity resolution 153 is performed by applying the LAMBDA algorithm. Finally, the estimated fixed GNSS-RTK positioning solution 154 is feedbacked to the 3D LiDAR sensor and the LIO to perform the PCM correction 142 for further correcting the drift of the 3D point clouds. By integrating the improved GNSS-RTK positioning aided by GNSS NLOS detection, the method can essentially correct the drift of the 3D point cloud map generated by LiDAR or inertial integration. As a result, the proposed method effectively combines the complementariness of LIO (locally accurate in a short period and provides environmental description for GNSS NLOS detection) and GNSS-RTK (free of drift with globally referenced positioning but affected by the GNSS NLOS).

The first embodiment of the present disclosure solves this problem by employing the perception capability of the 3D LiDAR sensor to detect and remove the potential GNSS NLOS reception. Such a method can achieve 10-centimeter accuracy even in urban canyons scenarios to fulfill the navigation requirements of autonomous driving. In the second embodiment of the present disclosure, it is provided an alternative method and system that employ the 3D LiDAR to help the GNSS single point positioning. The positioning can only be accurate within 5 meters, which is less accurate than the GNSS-RTK of the first embodiment.

Figure 2:
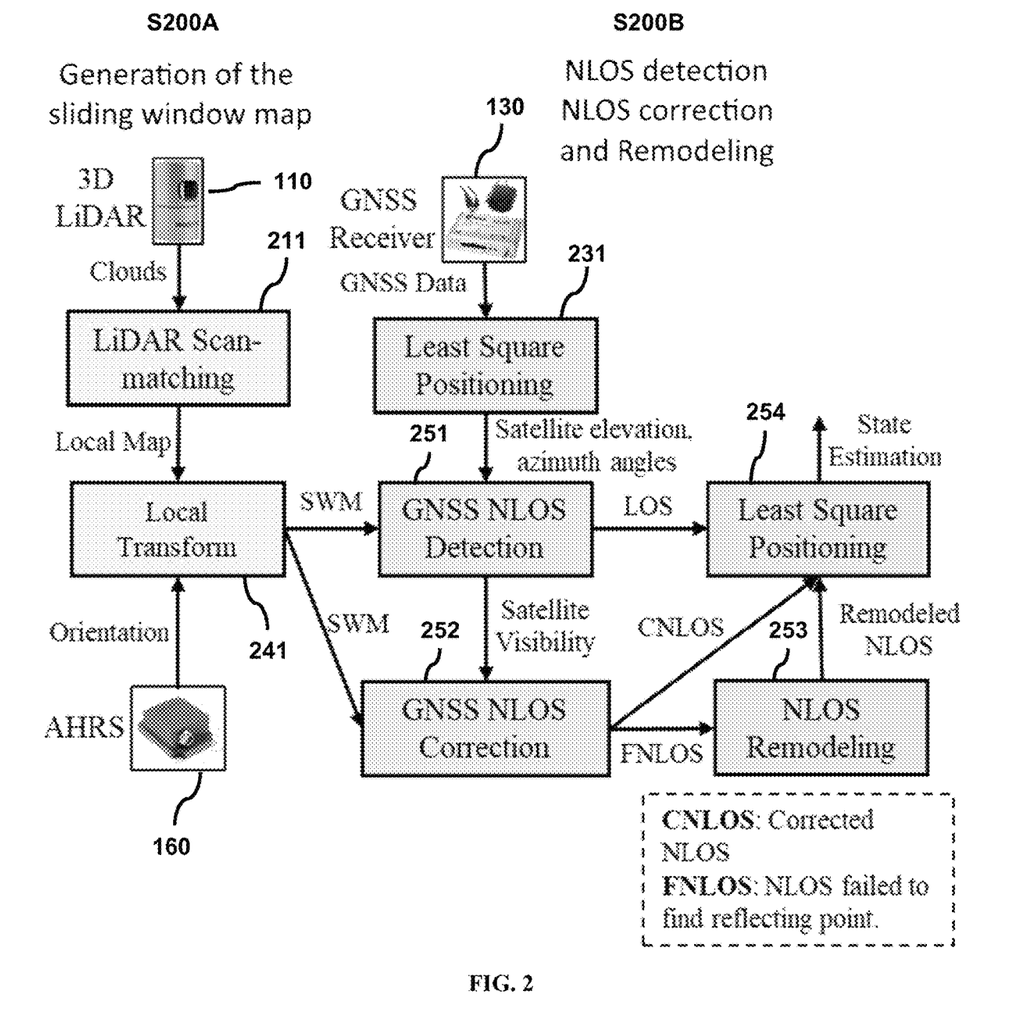
FIG. 2 is an overview of the 3D LiDAR aided GNSS NLOS mitigation method in accordance with an exemplary embodiment of the present disclosure.

Referring to FIG. 2, an overview of the 3D LiDAR aided GNSS NLOS mitigation method is illustrated. The system comprises two parts: (1) the real-time SWM generation S200A based on 3D point clouds from a 3D LiDAR sensor and an AHRS; and (2) the GNSS NLOS detection and rectification S200B based on a real-time environment description.

Advantageously, SWM is generated based on the real-time 3D point clouds from the 3D LiDAR sensor 110, wherein only the 3D point clouds inside the sliding window are employed to generate the SWM as the point clouds far away from the GNSS receiver 130 are not necessary for NLOS detection. Therefore the magnitude of draft of the SWM can be minimized. SWM is generated first using the 3D LiDAR sensor 110 and the AHRS 160, wherein the SWM essentially provides an environment description for detecting and correcting NLOS reception. A local map is obtained from the LiDAR scan-matching 211 based on the 3D point clouds from the 3D LiDAR sensor 110. The orientation is directly adopted from the AHRS 160 to transform the SWM from the body frame to a local ENU frame.

By performing local transformation 241, the SWM can be generated, which is performed in real-time for GNSS NLOS detection. This is essential for achieving better environment description capability, such that the FOV of the LiDAR sensing can be enhanced. In the conventional approaches, only real-time 3D point clouds are applied to further detect the NLS satellites. However, the capability of NLOS detection is limited by the FOV of the 3D LiDAR sensor 110. In this regard, the second embodiment of the present disclosure provides an improvement to the deficiency of the current art by accumulating real-time point clouds into the SWM that can effectively enhance the FOV of the 3D LiDAR sensor 110.

Figure 3:
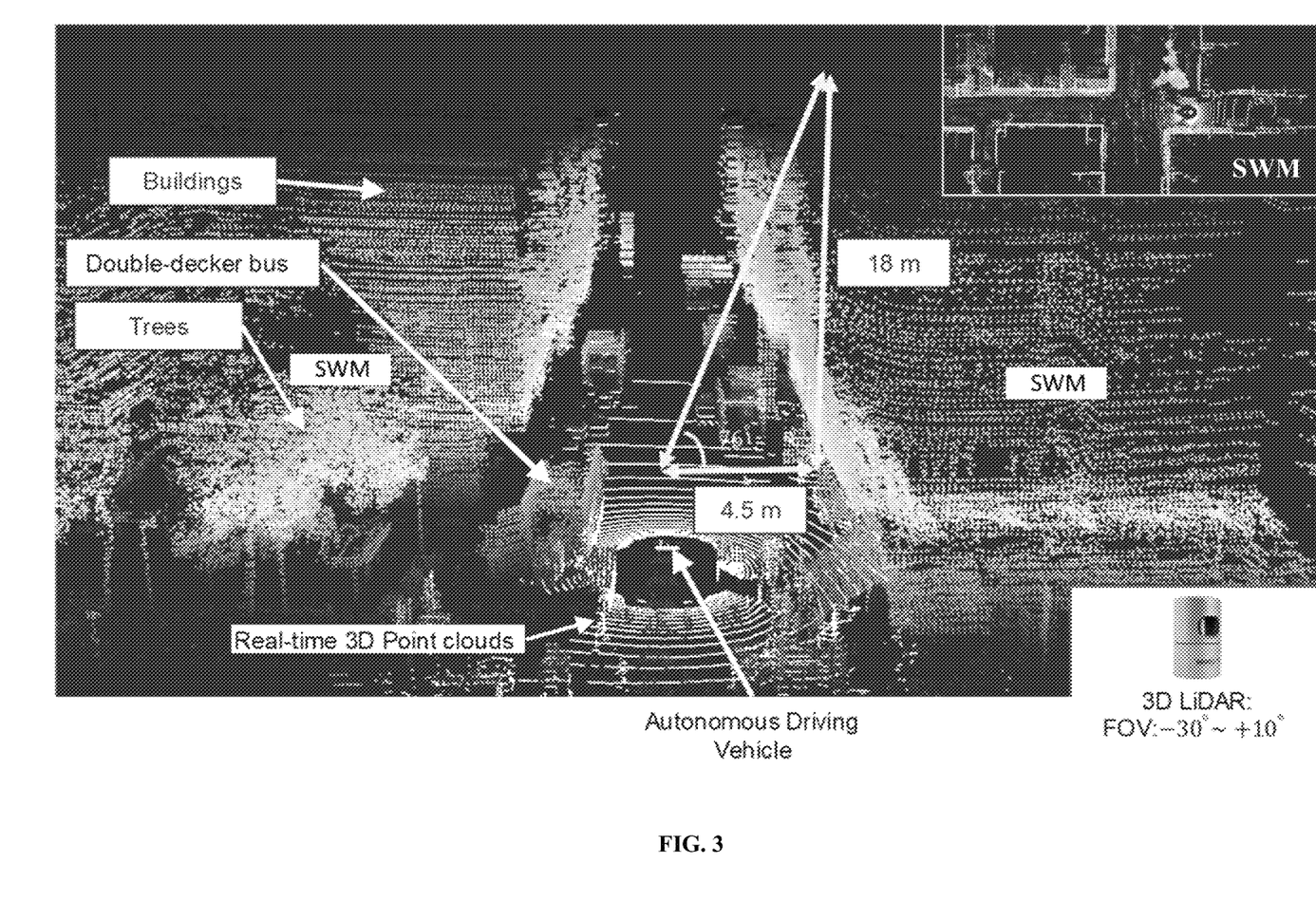
FIG. 3 is an exemplary demonstration of a generated sliding window map and the real-time 3D point clouds in accordance with an exemplary embodiment of the present disclosure.

With reference to the perceived digital world as shown in FIG. 3, the difference between the real-time 3D LiDAR point clouds and the SWM is shown. The perceived environment opens a new window to disclose the impact of the blockage or reflection of the GNSS signal transmission, caused by surrounding high-rising buildings, etc. The 3D LiDAR sensor 110 has limited FOV, the single frame 3D point clouds can only effectively detect the low-lying parts of buildings, and vehicles (e.g., double-decker buses). The visibility of satellites with high elevation angles cannot be effectively classified simply based on the real-time 3D point clouds. Real-time 3D point clouds are also sparse, due to the physical scanning angle distribution of the 3D LiDAR sensor 110.

With the SWM of the present disclosure, the above-stated problem can be effectively ameliorated. The map points of the SWM are shown in the FIG. 3 (ground points are removed from the SWM for efficient NLOS detection). The elevation mask angle may reach 76° with the help of the SWM, so the visibility of a satellite with an elevation angle of less than 76° may be classified. The point clouds in SWM are significantly denser than raw real-time 3D point clouds, which can contribute significantly to the accuracy of NLOS detection. A snapshot of the complete SWM map is shown at the top right corner of FIG. 3. Both the buildings and the dynamic objects, such as double-decker buses, and even the trees are involved in the SWM, which is not included in the 3D building model.

To generate a point cloud map based on real-time 3D point clouds, SLAM methods have been used conventionally. In fact, satisfactory accuracy can be obtained in a short period with low drift. However, the error can accumulate over time, causing large errors after long-term traveling and the loop closure is not usually available. Therefore, in practice, only the objects inside a circle with a radius of about 250 meters can cause GNSS NLOS reception, and buildings far away are ignored.

Figure 4:
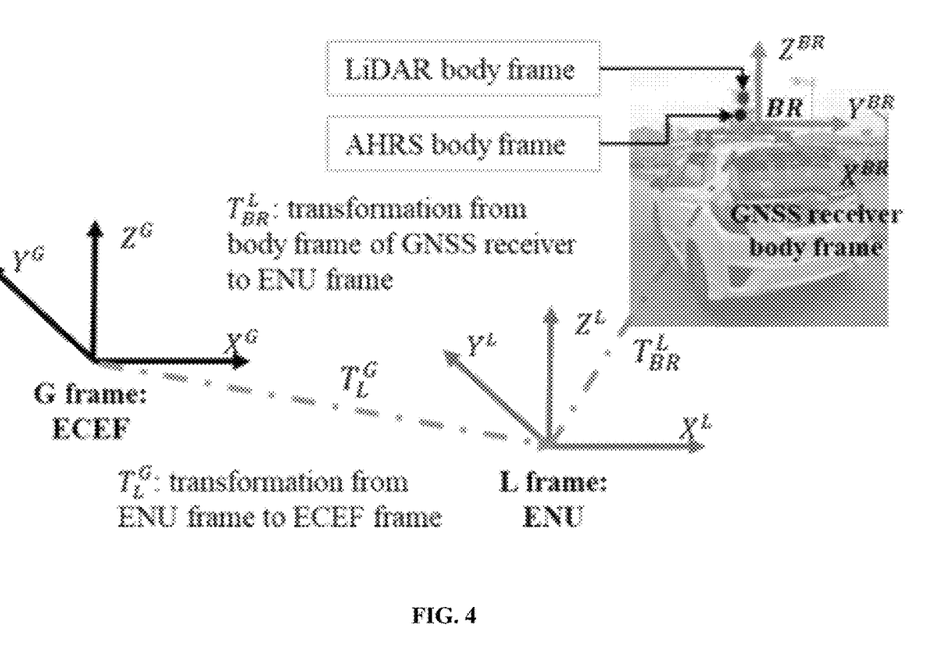
FIG. 4 is an overview of the coordinate systems adopted in the present disclosure.

Referring to FIG. 4, the transformation of the coordinate system is illustrated. The ECEF frame is fixed on the center of the Earth. A first point is selected as the reference of the ENU frame, while the extrinsic parameters between the LiDAR, AHRS, and GNSS receiver are fixed and calibrated beforehand. The L frame (ENU) is transformed to the G frame (ECEF) by $T_L^G$.

The present disclosure employed only the last $N_{sw}$ frames of the 3D point clouds to generate a sliding window map. As a result, the drift error for map generation is therefore bounded at a small value and is determined by the size of the window ($N_{sw}$). In order to minimize distinct drift in the vertical direction in urban canyons having numerous dynamic objects, the present disclosure employs an absolute ground to constrain the vertical drift. Below demonstrates the details of the algorithm for SWM generation:

Inputs: a series of point clouds from epoch $t-N_{sw}+1$ to epoch $t$ as $\{P_{t-N_{sw}+1}^{BL}, P_{t-N_{sw}+2}^{BL}, \ldots, P_t^{BL}\}$, the extrinsic parameters between 3D LiDAR, AHRS, and GNSS receiver.

Outputs: The SWM $M_t^L$

Step 1: Initialize $M_t^L \leftarrow$ empty

Step 2: SWM generation:

First, registering all the point clouds $\{P_{t-N_{sw}+1}^{BL}, P_{t-N_{sw}+2}^{BL}, \ldots, P_t^{BL}\}$ into a local map $M_t^{BL}$ with the $P_t^{BL}$ as the first frame; second, transforming a point $M_{t,i}^{BL}$ inside the local map $M_t^{BL}$ into the receiver body frame as $M_{t,i}^{BR}$ with the equation:

$$M_{t,i}^{BL} = R_{BL}^{BR} M_{t,i}^{BL} + t_{BL}^{BR}; \quad (Eq. 1)$$

and third, transforming a point $M_{t,i}^{BR}$ inside the local map $M_t^{BR}$ into the ENU frame as $M_{t,i}^L$ with the equation:

$$M_{t,i}^L = R_{BI,t}^L R_{BR}^{BL} M_{t,i}^{BL} + t_{BR}^L. \quad (Eq. 2)$$

Now referring back to FIG. 2, the second part of GNSS NLOS detection and rectification S200B is provided with four phases to the GNSS pseudorange measurements. First, GNSS NLOS detection 251 is performed for model validation based on satellite visibility classification using SWM, which can effectively identify the LOS satellites and NLOS satellites. Next, if one satellite is classified as NLOS, GNSS NLOS correction 252 as model calibration phase is performed, which re-estimates the GNSS measurement by correcting the NLOS pseudorange measurement (CNLOS). However, if one satellite is classified as NLOS while its reflection point is not found inside the SWM (FNLOS), then it implies that the NLOS correction is not available. The third phase is to perform NLOS remodeling 253, which is a model repair phase by de-weighting the NLOS measurements for use in further positioning. The GNSS positioning is estimated by a least-squares algorithm 254 based on the pseudorange measurements.

GNSS NLOS Detection by Model Validation 251

An object detection algorithm is not needed to recover the actual height of the detected dynamic objects or the building surface. As the SWM only provides unorganized discrete points, NLOS reception are directly detected based on real-time SWM using a fast-searching method, which does not require the object detection process.

Figure 5:
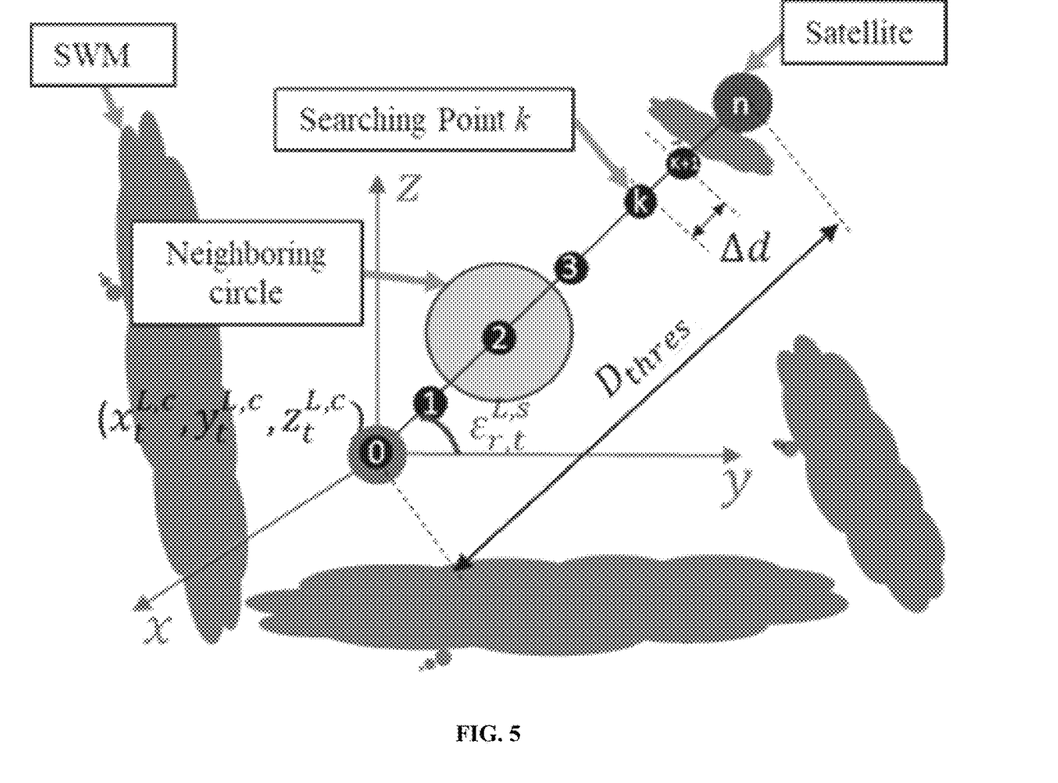
FIG. 5 is a conceptual drawing illustrating the detection of NLOS based on the generated sliding window map in accordance with an exemplary embodiment of the present disclosure.

The inputs to the fast-searching method include the SWM $M_t^L$, the elevation angle $\epsilon_{r,t}^s$ of the satellite s, the azimuth angle $\alpha_{r,t}^s$ at epoch t, the maximum search distance $D_{thres}$, and a constant incremental value $\Delta d_{pix}$. The fast-searching method is configured to determine the satellite visibility $v_{r,t}^s$ of the satellite s. In step 1, a search point is initialized at the center of the 3D LiDAR denoted by $(x_t^{L,c}, y_t^{L,c}, z_t^{L,c})$ in the ENU frame. A search direction connecting the GNSS receiver 130 and the satellite is determined by the elevation angle and the azimuth angle of the satellite. The SWM is transformed into a kdTree structure $M_{t,tree}^L$ for finding neighboring points. The kdTree is a special-structure for point cloud processing which can perform efficiently when searching neighboring points. In step 2, given a fixed incremental value $\Delta d_{pix}$, the search point is moved to the next point $(x_{t,k}^{L,c}, y_{t,k}^{L,c}, z_{t,k}^{L,c})$ based on the search direction exemplarily shown in FIG. 5, with the following equations:

$$x_{t,k}^{L,c} = x_{t,k-1}^{L,c} + \Delta d_{pix} \sin(\alpha_{r,t}^s)\cos(\epsilon_{r,t}^s) \quad (Eq. 3)$$

$$y_{t,k}^{L,c} = y_{t,k}^{L,c} + \Delta d_{pix} \cos(\alpha_{r,t}^s)\cos(\epsilon_{r,t}^s) \quad (Eq. 4)$$

$$z_{t,k}^{L,c} = z_{t,k-1}^{L,c} + \Delta d_{pix} \sin(\epsilon_{r,t}^s) \quad (Eq. 5)$$

The k denotes the index of the search point. The number of neighboring points ($N_k$) near the search point is counted. According to step 3, if $N_k$ exceeds a predetermined threshold $N_{thres}$, there are some map points from buildings or dynamic objects near the search point $(x_{t,k}^{L,c}, y_{t,k}^{L,c}, z_{t,k}^{L,c})$, and the line-of-sight connecting the GNSS receiver 130 and satellite is considered to be blocked. Therefore, satellite s is classified as an NLOS satellite. Otherwise, the above steps 2 and 3 are repeated. If $k\Delta d_{pix} > D_{thres}$, then the direction between the GNSS receiver 130 and the satellite is along the LOS. $D_{thres}$ can be set to define the distance within which positions are considered for NLOS detection. With the fast-searching method, satellite visibility can be classified.

Figure 6:
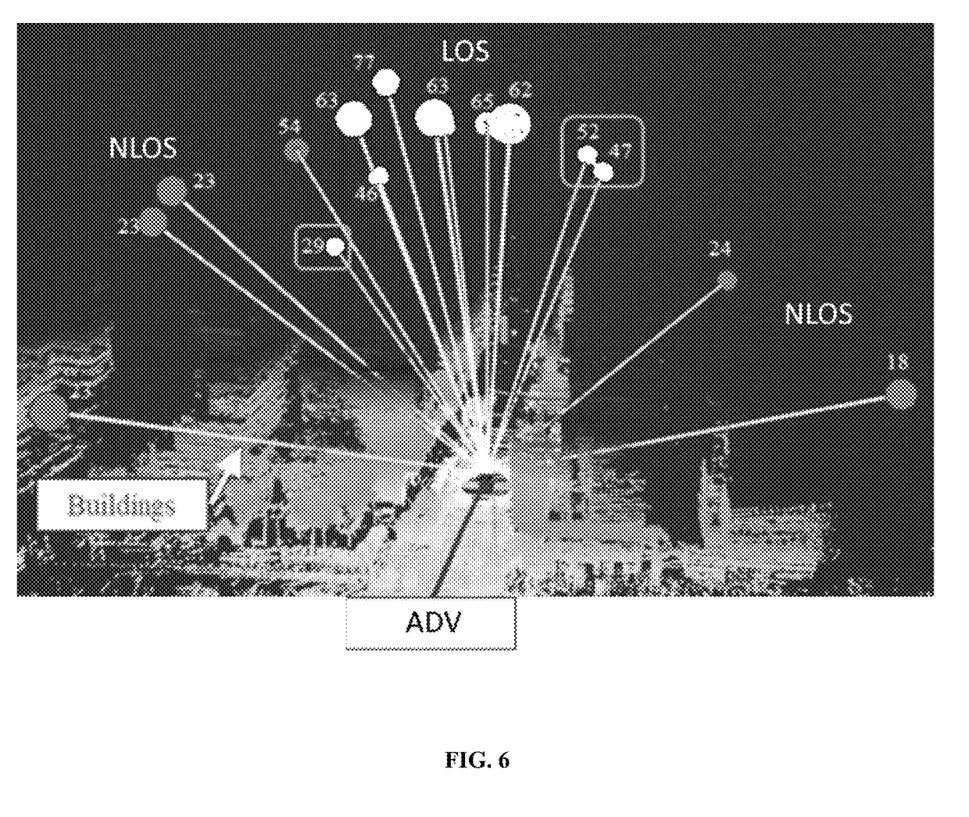
FIG. 6 is remodeling and correcting the polluted GNSS signals via the perceived world.

A demonstration of the satellite visibility classification result is shown in FIG. 6, with NLOS and LOS satellites.

The circles in gray represent polluted (multipath effects) GNSS satellites, and the circles in white represent healthy GNSS satellites. The numbers provided next to each circle denote the elevation angle of each satellite. From this example, an elevation angle of 54° is detected. As discussed before, the maximum mask elevation angle is 76° while the elevation angle based on SWM may significantly be correlated with the width of the street. With a narrower street, a higher mask elevation angle can be achieved. Nevertheless, NLOS satellites with low elevation angles may result in a majority of the GNSS positioning errors. Even with the challenging urban canyons, the present disclosure is provided to detect and recover the signal blockage and reflections to achieve highly accurate GNSS positioning.

GNSS NLOS Correction by Model Calibration 252

The NLOS correction is performed by model calibration based on the SWM. To effectively estimate the potential NLOS error, the distance between the GNSS receiver, satellite elevation, and azimuth angles are needed based on the NLOS error model. In particular, the model calibration comprises detecting a reflection point corresponding to the NLOS reception. Conventionally, ray-tracing technique is used to simulate NLOS signal transmission routes for finding the NLOS reflectors. However, this technique comes with the drawback of high computational power. The present disclosure provides a method that does not produce continuous building surfaces and clear building boundaries. Instead, the SWM only provides large amounts of dense, discrete, unorganized point clouds. The search for the reflectors from the SWM is performed using an efficient kdTree structure based on a reflector detection algorithm.

The inputs to the reflector detection algorithm for performing model calibration include the SWM $M_t^L$, the elevation angle $\epsilon_{r,t}^s$ of the satellite s, the azimuth angle $\alpha_{r,t}^s$ at epoch t, and the azimuth resolution $\alpha_{res}$. The output is the closest reflection point $p_{r,t}^{L,s}$, which is the most probable reflector for an NLOS satellite s.

In step 1, a search point is initialized at the center of the 3D LiDAR. The search direction is determined based on the satellite elevation angle $\epsilon_{r,t}^s$ and the azimuth angle $\alpha_{r,t}^s$.

For a typical signal reflection route, two segments are included. The first segment is the signal transmission from the satellite to the reflector. The second segment is the signal transmission from the reflector to the GNSS receiver 130. As the reflected signal should have the same elevation angle as the expected directed signal, step 2 of the reflector detection algorithm comprises traversing all the azimuths from 0° to 360° with an azimuth resolution of $\alpha_{res}$ and an elevation angle of $\epsilon_{r,t}^s$, thereby all the possible routes of NLOS transmissions are found.

In step 3, if the line-of-sight associated with the direction is blocked by a point $p_j$, the point $p_j$ can potentially be a reflection point. In particular, if the line-of-sight connecting the point $p_j$ and the satellite is not blocked, point $p_j$ is considered as a possible reflector and is saved to $Q_{r,t}^{L,s}$.

In step 4, steps 2 and 3 are repeated until $\alpha_s > 360°$, such that all possible reflectors are identified based on the assumption of the same elevation angles.

Lastly, step 5 detects a unique reflector from $Q_{r,t}^{L,s}$ with the shortest distance between the GNSS receiver 130 and the reflector, based on the shortest distance assumption.

Advantageously, the reflector detection algorithm does not rely on the accuracy of the detection of building surfaces. The short distance assumption can effectively prevent overcorrection, as only the closest reflector is identified as the unique reflector. The potential NLOS delay for a satellite s can be calculated as:

$$d_{r,t}^{L,s} = \|p_{r,t}^{L,s}\| \sec(\epsilon_{r,t}^s) + \|p_{r,t}^{L,s}\| \sec(\epsilon_{r,t}^s)\cos(2\epsilon_{r,t}^s) \quad \text{(Eq. 6)}$$

wherein the operator $\|*\|$ is used to calculate the norm of a given vector. The sec (*) denotes the secant function. Due to the sparsity of the SWM, although it is still denser than the 3D real-time point clouds, there are still some satellites whose reflectors cannot be found using the SWM. Therefore, NLOS remodeling is proposed if one satellite is classified as NLOS, but its reflection point is not found inside the SWM.

NLOS Remodeling for Model Repair 253

Satellites with lower elevation angles and smaller SNR have a higher possibility of contamination by NLOS errors. The conventional approach of Pseudorange uncertainty modeling based on the satellite elevation angle and SNR can produce a satisfactory performance in open areas, but not in a deep urban canyon. Particularly, the weighting scheme treats the LOS and NLOS in the same manner, which is not preferable when the NLOS has already been detected. The present disclosure corrects the GNSS NLOS reception by performing NLOS remodeling, which essentially models the uncertainty of LOS and NLOS using the weighting scheme, with a scaling factor added to de-weight the NLOS measurements. The weighting scheme comprises: (1) if a satellite is classified as a LOS measurement, the scaling factor is calculated based on satellite SNR and elevation angle; (2) if a satellite is classified as an NLOS measurement and the pseudorange error is corrected, the scaling factor is calculated based on satellite SNR and elevation angle; and (3) if a satellite is classified as an NLOS measurement but the reflection point is not detected, the scaling factor is calculated based on satellite SNR and elevation angle together with a scaling factor $K_w$.

GNSS Positioning by a Least-Squares Algorithm 254

The pseudorange measurement $\rho_{r,t}^s$ from the GNSS receiver is denoted as:

$$\rho_{r,t}^s = r_{r,t}^s + c(\delta_{r,t} - \delta_{r,t}^s) + I_{r,t}^s + T_{r,t}^s + \epsilon_{r,t}^s \quad \text{(Eq. 7)}$$

wherein:

$r_{r,t}^s$ is the geometric range between the satellite and the GNSS receiver;

$I_{r,t}^s$ is the ionospheric delay distance;

$T_{r,t}^s$ is the tropospheric delay distance; and $\epsilon_{r,t}^s$ is the noise caused by the multipath effects, NLOS reception, receiver noise, and antenna phase-related noise.

Meanwhile, the atmosphere effects ($T_{r,t}^s$ and $I_{r,t}^s$) are compensated using the conventional Saastamoinen model and Klobuchar model respectively. The observation model for GNSS pseudorange measurement from a given satellite s is represented by:

$$\rho_{r,t}^s = h_{r,t}^s(P_{r,t}, P_t^s, \delta_{r,t}) + \epsilon_{r,t}^s$$

$$\text{with } h_{r,t}^s(P_{r,t}^G, P_t^{G,s}, \delta_{r,t}) = \|p_t^{G,s} - p_{r,t}^G\| + \delta_{r,t}; \quad \text{(Eq. 8)}$$

wherein $\epsilon_{r,t}^s$ is the noise associated with the $\rho_{r,t}^s$.

Given that the NLOS error $d_{r,t}^{L,s}$ is subtracted from $\rho_{r,t}^s$ before being used in the further GNSS positioning, the Jacobian matrix $G_t^G$ for the observation function $h_{r,t}^s(*)$ can be denoted as:

$$G_t^G = \begin{bmatrix} \frac{p_{t,x}^{G,1} - p_{r,t,x}^G}{\|P_t^{G,1} - P_{r,t}^G\|} & \frac{p_{t,y}^{G,1} - p_{r,t,y}^G}{\|P_t^{G,1} - P_{r,t}^G\|} & \frac{p_{t,z}^{G,1} - p_{r,t,z}^G}{\|P_t^{G,1} - P_{r,t}^G\|} & 1 \\ \frac{p_{t,x}^{G,2} - p_{r,t,x}^G}{\|P_t^{G,2} - P_{r,t}^G\|} & \frac{p_{t,y}^{G,2} - p_{r,t,y}^G}{\|P_t^{G,2} - P_{r,t}^G\|} & \frac{p_{t,z}^{G,2} - p_{r,t,z}^G}{\|P_t^{G,2} - P_{r,t}^G\|} & 1 \\ \frac{p_{t,x}^{G,3} - p_{r,t,x}^G}{\|P_t^{G,3} - P_{r,t}^G\|} & \frac{p_{t,y}^{G,3} - p_{r,t,y}^G}{\|P_t^{G,3} - P_{r,t}^G\|} & \frac{p_{t,z}^{G,3} - p_{r,t,z}^G}{\|P_t^{G,3} - P_{r,t}^G\|} & 1 \\ \cdots & \cdots & \cdots & \cdots \\ \frac{p_{t,x}^{G,m} - p_{r,t,x}^G}{\|P_t^{G,m} - P_{r,t}^G\|} & \frac{p_{t,y}^{G,m} - p_{r,t,y}^G}{\|P_t^{G,m} - P_{r,t}^G\|} & \frac{p_{t,z}^{G,m} - p_{r,t,z}^G}{\|P_t^{G,m} - P_{r,t}^G\|} & 1 \end{bmatrix} \quad \text{(Eq. 9)}$$

wherein m denotes the total number of the satellite at epoch t.

The position of the GNSS receiver can be estimated via weighted least squares iteratively as follows:

$$\begin{bmatrix} P_{r,t}^G \\ \delta_{r,t} \end{bmatrix} = (G_t^{G^T} W_t G_t^G)^{-1} G_t^{G^T} W_t \begin{bmatrix} \rho_{r,t}^1 \\ \vdots \\ \rho_{r,t}^m \end{bmatrix} \quad \text{(Eq. 10)}$$

wherein $W_t$ denotes the weighting matrix based on the weightings estimated in the NLOS Remodeling 253, as follows:

$$W_t = \begin{bmatrix} \omega_{r,t}^1 & 0 & 0 & 0 \\ 0 & \omega_{r,t}^2 & 0 & 0 \\ 0 & 0 & \ddots & 0 \\ 0 & 0 & 0 & \omega_{r,t}^s \end{bmatrix} \quad \text{(Eq. 11)}$$

wherein:

$$\omega_{r,t}^s = \begin{cases} f(\varepsilon_{r,t}^s, \psi_{r,t}^s), & \text{if LOS or CNLOS} \\ K_w f(\varepsilon_{r,t}^s, \psi_{r,t}^s), & \text{if FNLOS} \end{cases}$$

$f(\varepsilon_{r,t}^s, \psi_{r,t}^s)$ is defined to calculate the weighting of the LOS measurement based on the satellite SNR and elevation angle as follows:

$$f(\varepsilon_{r,t}^s, \psi_{r,t}^s) = = \frac{1}{\sin^2 \varepsilon_{r,t}^s} \left( 10 - \frac{(\psi_{r,t}^s - T)}{a} \left( \left( \frac{A}{10^{\frac{(F-T)}{a}}} - 1 \right) \frac{(\psi_{r,t}^s - T)}{F - T} + 1 \right) \right). \quad \text{(Eq. 12)}$$

wherein T indicates the SNR threshold; and a, A, and F are predetermined.

Figure 7:
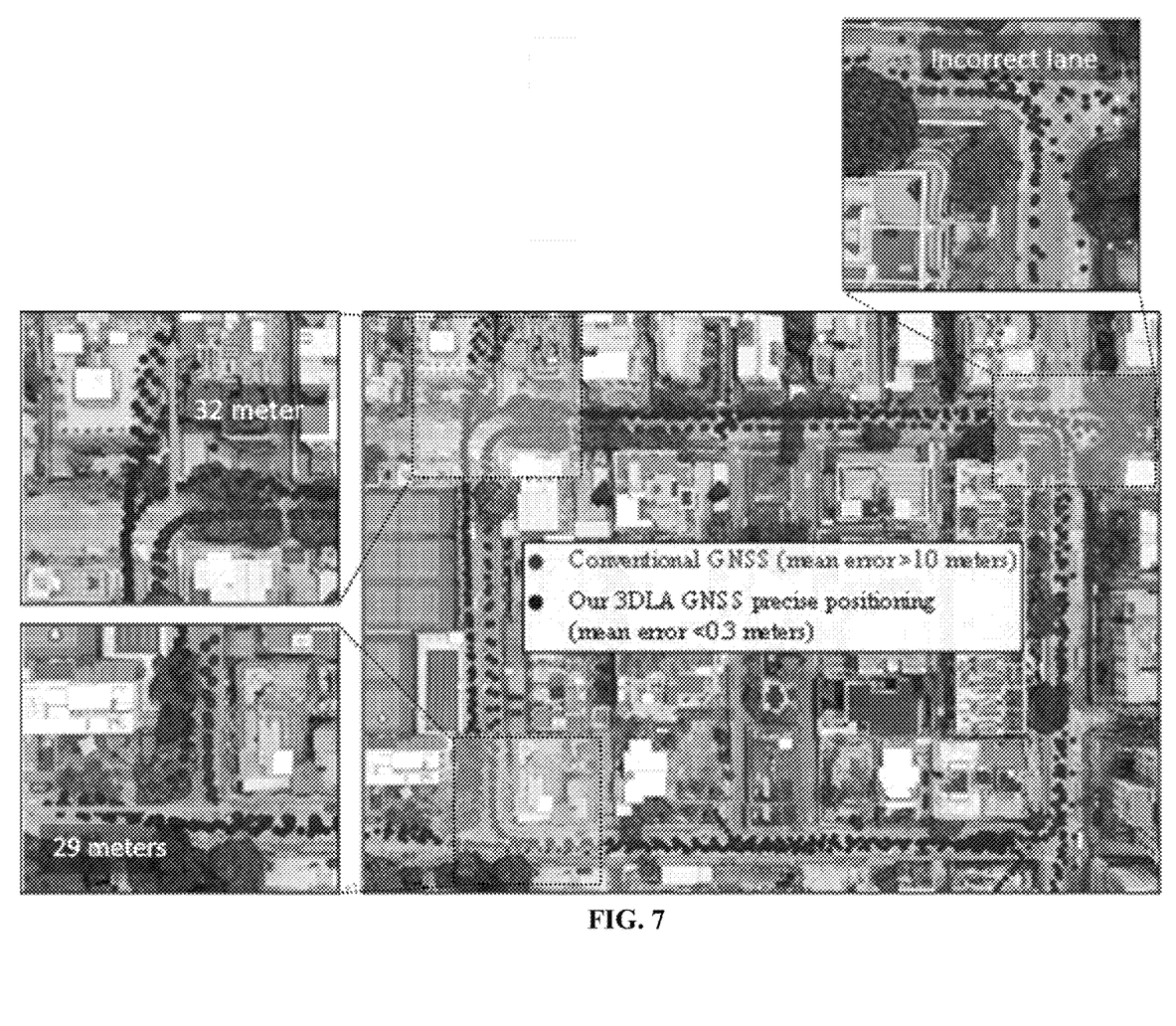
FIG. 7 is a positioning performance before and after applying the 3D LiDAR aided GNSS real-time kinematic positioning method in accordance with an exemplary embodiment of the present disclosure.

FIG. 7 shows the positioning performance before and after applying the developed 3D LiDAR aided GNSS real-time kinematic positioning method of the first embodiment of the present disclosure. Conventional GNSS solutions experience has approximately 30 meters error, resulting in misjudging the lane where the vehicle operated at an urban canyon. The developed technology can provide robust and precise positioning results to support the operation of L4 autonomous vehicles.

Experimental Results

To verify the effectiveness of the proposed method, two experiments were conducted in typical urban canyons having static buildings, trees, and dynamic objects, such as double-decker buses. The first experiment was conducted in an urban canyon 1 with a street width of 22 meters and a building height of 35 meters. The second experiment was conducted in an urban canyon 2 with a street width of 12.1 meters and a building height of 65 meters.

The vehicle is equipped with a u-blox M8T GNSS receiver for collecting raw GNSS measurements at a frequency of 1 Hz. The 3D LiDAR sensor is Velodyne 32, configured to collect raw 3D point clouds at a frequency of 10 Hz. The Xsens Ti-10 INS was employed to collect data at a frequency of 100 Hz. Besides, the NovAtel SPAN-CPT, a GNSS (GPS, GLONASS, and Beidou) RTK/INS (fiber-optic gyroscopes, FOG) integrated navigation system was used to provide ground truth of positioning. The gyro bias in-run stability of the FOG is 1 degree per hour, and its random walk is 0.067 degrees per hour. The baseline between the rover and the GNSS base station is about 7 km. All the data were collected and synchronized using a ROS. The following five sets of configurations were evaluated: (1) u-blox GNSS receiver only; (2) weighted least squares method (WLS); (3) weighted least squares method with all NLOS satellites excluded (WLS-NE); (4) weighted least squares method with the aid of the re-weighting on all NLOS satellites (R-WLS); and (5) weighted least squares method with the aid of the NLOS correction if the reflector was detected, and re-weighting the NLOS satellites if the reflector was not detected (CR-WLS).

TABLE 1

Positioning performance of GNSS SPP in urban canyon 1

| All Data | u-blox | WLS | WLS-NE | R-WLS | CR-WLS |
| --- | --- | --- | --- | --- | --- |
| MEAN (m) | 31.02 | 9.57 | 11.63 | 9.01 | 7.92 |
| STD (m) | 37.69 | 7.32 | 13.05 | 6.90 | 5.27 |
| Max (m) | 177.59 | 46.29 | 52.93 | 43.59 | 41.75 |
| Avail | 100% | 100% | 96.01% | 100% | 100% |

The results of the GNSS positioning experiments using the five methods are shown in Table 1 above. The positioning result using u-blox receiver has a mean error of 31.02 meters, with a standard deviation of 37.69 meters. The maximum error reached 177.59 meters due to the severe multipath and NLOS receptions from surrounding buildings. For WLS, the positioning error decreased to 9.57 meters with a standard deviation of 7.32 meters. The maximum error also decreased to less than 50 meters. The positioning error increased to 11.63 meters after excluding all detected NLOS satellites, a result that is even worse than that of the WLS. This situation arose because excessive NLOS exclusion can significantly distort the perceived geometric distribution of the satellites. Availability decreased slightly from 100% to 96.01%. Complete NLOS exclusion is therefore not preferable in dense urban canyons. The results of R-WLS, where all the NLOS satellites were remodeled based on the weighting scheme, show a mean error is reduced to 9.01 meters, with a slight decrease in standard deviation and maximum error when compared with WLS. Lastly, the complete implementation of the present disclosure of CR-WLS shows a much lower mean error of 7.92 meters, with a standard deviation of 5.27 meters. The maximum error is also reduced to 41.75 meters. The improved GNSS positioning results demonstrate the effectiveness of the proposed method in mitigating the effects of NLOS signals.

TABLE 2

| Positioning performance of GNSS SPP in urban canyon 2 | | | | | |
|---|---|---|---|---|---|
| All Data | u-blox | WLS | WLS-NE | R-WLS | CRAWLS |
| MEAN (m) | 30.68 | 23.79 | 25.14 | 19.61 | 17.09 |
| STD (m) | 26.53 | 18.22 | 23.73 | 19.80 | 20.95 |
| Max (m) | 92.32 | 104.83 | 109.30 | 86.14 | 71.28 |
| Avail | 100% | 100% | 95.52% | 100% | 100% |

In a more challenging situation of the urban canyon 2, it was found that some NLOS satellites reflected by buildings taller than 40 meters may not be detected. The positioning error of 30.68 meters was obtained using the u-blox receiver with a maximum error of 92.32 meters. A GNSS positioning error of 23.79 meters was obtained using WLS based on the raw pseudorange measurements from the u-blox receiver. The maximum error increased slightly to 104.83 meters, compared with the GNSS positioning using data directly from the u-blox receiver. After excluding all detected NLOS satellites from the GNSS positioning (WLS-NE), both the mean and standard deviation increased to 25.14 and 23.73 meters, respectively. The availability of GNSS positioning data decreased to 95.52%, due to the lack of satellites for GNSS positioning, which again shows that complete NLOS exclusion is not preferable in urban canyons. With the help of NLOS remodeling, the 2D error decreased to 19.61 meters using R-WLS. One hundred percent availability is guaranteed. The GNSS positioning error was further decreased to 17.09 meters using the CR-WLS method. The improvement in the results shows the effectiveness of the proposed method for 3D LiDAR aided GNSS positioning. The maximum error still reached 71.28 meters, because not all NLOS satellites can be detected and mitigated.

Figure 8:
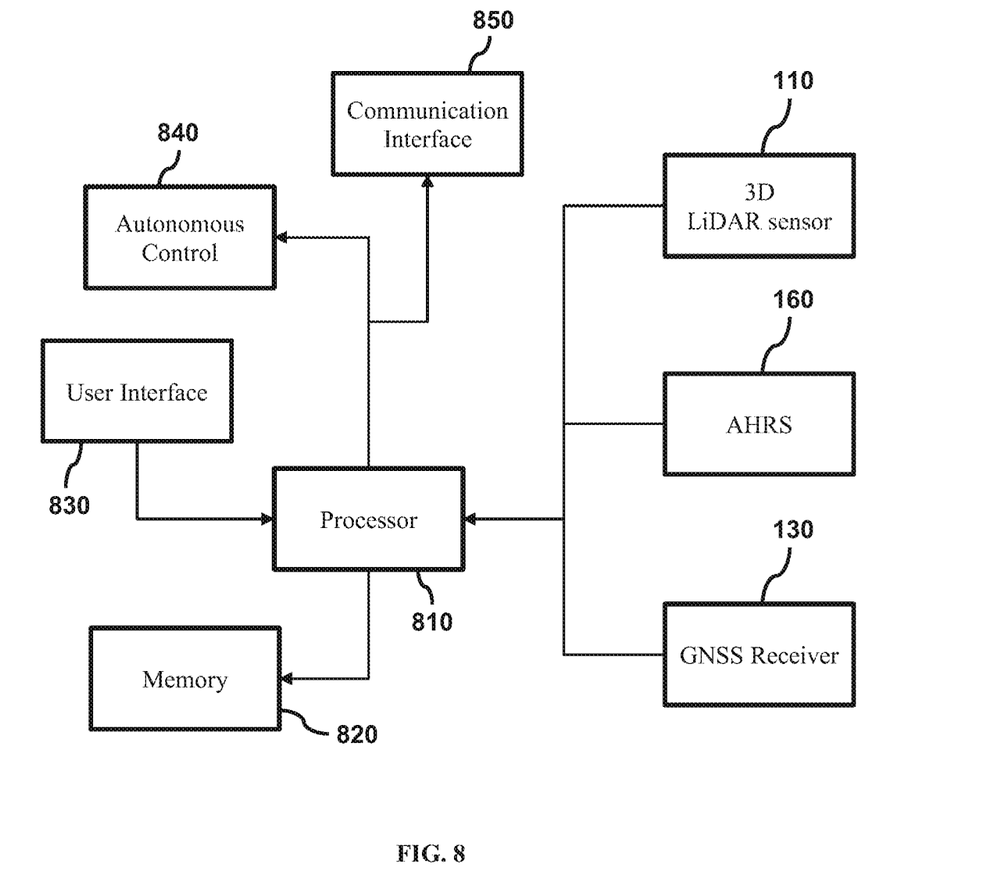
FIG. 8 is a system diagram of the 3D LiDAR aided GNSS configured to utilize the 3D LiDAR aided GNSS NLOS mitigation method and incorporated into a vehicle in accordance with an embodiment of the present disclosure.

FIG. 8 is a system diagram of one possible implementation and incorporation of the 3D LiDAR aided GNSS NLOS mitigation method in a vehicle in accordance with an exemplary embodiment of the present disclosure. The LiDAR aided GNSS is used by a vehicle for supporting the positioning of the vehicle using a satellite positioning system. In certain embodiments, the system includes the 3D LiDAR sensor 110, the AHRS 160, the GNSS receiver 130, a processor 810, a memory 820, a user interface 830, an autonomous control 840, and a communication interface 850. In certain embodiments, the 3D LiDAR sensor 110, the AHRS 160, and/or the GNSS receiver 130 may be integrated into the processor 810 without departing from the scope and spirit of the present disclosure. In such a case, the processor 810 is an application-specific device with built-in components capable of receiving GNSS satellite signals, orientation, and/or local 3D point cloud map.

The processor 810 may be one or more general-purpose processors, application-specific processors, digital signal processing chips, application-specific integrated circuits (ASICs), or other processing structures which may be configured to perform one or more of the methods described above. The processor 810 is communicatively connected to the 3D LiDAR sensor 110, the AHRS 160, and the GNSS receiver 130 for receiving a local map, an orientation, and GNSS measurement respectively. The processor 810 may comprise memory 820, or be in communication with a memory 820 (as a discrete component) for storing the positioning data and/or other received signals and retrieving previous frames for SWM which is beneficial for enhancing the FOV of the 3D LiDAR sensor 110.

In certain embodiments, the memory 820 may comprise, without limitation, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like. The memory 820 may further comprise software instructions configured to cause the processor 810 to execute one or more functions in accordance with the methods of the present disclosure. Therefore, the function and the method described above might be implemented as computer code and/or instructions executable by the processor 810. In an aspect, then, such code and/or instructions can be used to configure and/or adapt a computer (or other computer devices) to perform one or more operations in accordance with the described methods. The memory 820 may therefore comprise non-transitory machine-readable media having the instructions and/or computer code embedded therein. Common forms of computer-readable media include, for example, a hard disk, magnetic or optical media, a RAM, a PROM, an EPROM, a FLASH-EPROM, a USB memory stick, any other memory chip or cartridge, a carrier wave, or any other medium from which a computer can read instructions and/or code.

The user interface 830 allows interaction with the driver, passengers, and/or other individuals controlling the vehicle, which may comprise one or more input devices selected from the group consisting touch screen, touch pad, button, switch, microphone, and the like. The driver or the person controlling the vehicle may use the user interface 830 to activate or deactivate the autonomous control 840, or select different modes of operation and/or degrees of autonomous driving.

The autonomous control 840 is an output device for controlling the vehicle based on the GNSS positioning. The processor 810 can therefore determine the positions of the vehicle, the static buildings, and the dynamic objects, which can enable the vehicle to potentially alter the navigation routes, speed, acceleration, in-vehicle alert system, and/or other functions accordingly. The autonomous control 840 can therefore realize various functions for intelligent transportation systems, such as autonomous driving, semi-autonomous driving, navigation, etc.

The communication interface 850 provides an interface that permits data to be communicated with a network, a vehicle, a location server, a server, wireless access points, other computer systems, and/or any other electronic devices described herein. In certain embodiments, the communication interface 850 may comprise, without limitation, a modem, a network card, an infrared communication device, a wireless communication device, and/or a chipset (such as a Bluetooth device, an IEEE 802.11 device, an IEEE 802.15.4 device, a WIFI device, a WiMAX device, cellular communication facilities, etc.), and/or the like.

This system diagram is meant to provide a generalized illustration of the 3D LiDAR aided GNSS, while other components and system blocks may also be included as appropriate and necessary. One or more components inside the system may be integrated or partitioned, and may be disposed at different physical locations in the vehicle, or otherwise remotely in a server or on the network system. An overriding control (not shown) or other safety mechanisms may also be provided for allowing the driver or passengers of the vehicle to take over the control of the vehicle in the event of an emergency.

As demonstrated, the methods of the present disclosure provide effective methods to exclude the potential GNSS NLOS reception, aided by the environment description generated with 3D LiDAR sensor and LIO, or by SWM using 3D LiDAR sensor and AHRS. The method enables accurate positioning even in urban canyons for autonomous driving. The present disclosure solves the problem of insufficient positioning accuracy that prevents the application and deployment of autonomous driving. On top of all these existing positioning solutions, the GNSS-RTK is an indispensable method that is capable of providing globally referenced positioning in sparse scenarios. However, its accuracy is not guaranteed in urban canyons due to the signal blockage and reflections causing GNSS NLOS reception. The present disclosure solves this problem by employing the perception capability of 3D LiDAR to detect and remove the potential GNSS NLOS reception. In certain embodiments, the method provided herein can achieve higher precision even in urban canyons scenarios to fulfill the navigation requirements of autonomous driving.

The foregoing method can be directly deployed to the autonomous driving industry. Specifically, this invention can be used to provide accurate positioning solutions even in urban canyons. Besides, the method can also be deployed in other kinds of autonomous systems with navigation requirements, such as mobile robots and unmanned aerial vehicles. Meanwhile, the proposed method can be also used in geodetic mapping in urban canyons.

This illustrates the 3D LiDAR aided global navigation satellite system with improved positioning performance in accordance with the present disclosure. It will be apparent that variants of the above-disclosed and other features and functions, or alternatives thereof, may be combined into many other different configurations, devices, apparatuses, and systems. The present embodiment is, therefore, to be considered in all respects as illustrative and not restrictive. The scope of the disclosure is indicated by the appended claims rather than by the preceding description, and all changes that come within the meaning and range of equivalency of the claims are therefore intended to be embraced therein.

What is claimed is:

1. A method, used by a vehicle, for supporting positioning of the vehicle using a satellite positioning system, the method comprising:
    receiving a LiDAR factor and an inertial measurement unit (IMU) factor, from a 3D LiDAR sensor and a LiDAR inertial odometry (LIO);
    integrating the LiDAR factor and the IMU factor using a local factor graph optimization for estimating a relative motion between two epochs;
    generating a 3D point cloud map (PCM) as an auxiliary landmark satellite for providing a low elevation auxiliary landmark satellite;
    receiving global navigation satellite system (GNSS) measurements from satellites, by a GNSS receiver;
    detecting a GNSS non-line-of-sight (NLOS) reception from the GNSS measurements using the 3D PCM; and
    excluding the GNSS NLOS reception from the GNSS measurements to obtain survived GNSS satellite measurements for enhancing GNSS measurement quality for the positioning of the autonomous driving vehicle.

2. The method of claim 1 further comprising:
    performing a global navigation satellite system real-time kinematic (GNSS-RTK) float estimation on the survived GNSS satellite measurements to obtain a float solution;
    performing an ambiguity resolution to obtain a fixed ambiguity solution; and
    determining a fixed GNSS-RTK positioning solution from the float solution and the fixed ambiguity solution.

3. The method of claim 2, wherein the ambiguity resolution is performed by applying a LAMBDA algorithm.

4. The method of claim 2 further comprising:
    feedbacking the fixed GNSS-RTK positioning solution to the 3D LiDAR sensor and the LIO; and
    performing PCM correction using the fixed GNSS-RTK positioning solution for correcting a drift of 3D point clouds.

5. The method of claim 2 further comprising obtaining an initial guess of the float solution using least-squares algorithms on the GNSS measurements.

6. A method, used by a vehicle, for supporting positioning of the vehicle using a satellite positioning system, the method comprising:
    generating, in real-time, a sliding window map (SWM) based on 3D point clouds from a 3D LiDAR sensor and an attitude and heading reference system (AHRS), wherein the SWM provides an environment description for detecting and correcting a non-line-of-sight (NLOS) reception;
    accumulating the 3D point clouds from previous frames into the SWM for enhancing a field of view (FOV) of the 3D LiDAR sensor;
    receiving, by a GNSS receiver, global navigation satellite system (GNSS) measurements from satellites;
    detecting NLOS reception from the GNSS measurements using the SWM;
    correcting the NLOS reception by NLOS remodeling when a reflection point is not found in the SWM; and
    estimating a GNSS positioning by a least-squares algorithm.

7. The method of claim 6 further comprising minimizing a magnitude of draft of the SWM by excluding point clouds far away from the GNSS receiver, such that the 3D point clouds are inside a sliding window.

8. The method of claim 6, wherein the step of generating the SWM comprises:
    obtaining a local map from a LiDAR scan-matching based on the 3D point clouds from the 3D LiDAR sensor; and
    adopting an orientation from the AHRS to transform the SWM from a body frame to a local East North Up (ENU) frame.

9. The method of claim 6, wherein the step of detecting the NLOS reception from the GNSS measurements is performed using a fast-searching method, wherein the fast-searching method comprises:
    initializing a search point at a center of the 3D LiDAR sensor;
    determining a search direction connecting the GNSS receiver and a satellite based on an elevation angle and an azimuth angle of the satellite;
    moving the search point along the search direction with a fixed incremental value $\Delta d_{pix}$;
    counting a number of neighboring points ($N_k$) near the search point; and
    classifying the search point as an NLOS satellite if $N_k$ exceeds a predetermined threshold $N_{thres}$.

10. The method of claim 6 further comprising correcting the NLOS reception by re-estimating the GNSS measurement using a model calibration based on the SWM, wherein the SWM provides the 3D point clouds that are dense, discrete, and unorganized without continuous building surfaces or boundaries.

11. The method of claim 10, wherein the model calibration comprises:
   detecting a reflection point corresponding to the NLOS reception using an efficient kdTree structure based on a reflector detection algorithm, wherein the reflector detection algorithm comprises:
      traversing all the azimuths from 0° to 360° with an azimuth resolution of $\alpha_{res}$ and an elevation angle of $\epsilon_{r,t}^{s}$;
      detecting a potential reflector when a line-of-sight connecting the point $p_j$ and a satellite is not blocked; and
      detecting a unique reflector with a shortest distance between the GNSS receiver and the potential reflectors.

12. The method of claim 6, wherein the NLOS remodeling is performed using a weighting scheme with a scaling factor, wherein the scaling factor is used to de-weight the NLOS reception, wherein the weighting scheme comprises a determination that:
   if a satellite is classified as a LOS measurement, the scaling factor is calculated based on a satellite signal to noise ratio (SNR) and an elevation angle;
   if the satellite is classified as an NLOS measurement and a pseudorange error is corrected, the scaling factor is calculated based on the satellite SNR and the elevation angle; and
   if the satellite is classified as an NLOS measurement but the reflection point is not detected, the scaling factor is calculated based on the satellite SNR, the elevation angle, and a scaling factor $K_w$.

13. A LiDAR aided global navigation satellite system, used by a vehicle, for supporting positioning of the vehicle using a satellite positioning system, the system comprising:
   a 3D LiDAR sensor;
   an attitude and heading reference system (AHRS);
   a global navigation satellite system (GNSS) receiver configured to receive GNSS measurements from satellites;
   a processor communicatively connected to the 3D LiDAR sensor, the AHRS, and the GNSS receiver, wherein the processor is configured to:
      generate, in real-time, a sliding window map (SWM) based on 3D point clouds from the 3D LiDAR sensor and the AHRS, wherein the SWM provides an environment description for detecting and correcting a non-line-of-sight (NLOS) reception;
      accumulate the 3D point clouds from previous frames into the SWM for enhancing a field of view (FOV) of the 3D LiDAR sensor;
      detect NLOS reception from the GNSS measurements from the GNSS receiver using the SWM;
      correct the NLOS reception by NLOS remodeling when a reflection point is not found in the SWM; and
      estimate a GNSS positioning by a least-squares algorithm.

14. The system of claim 13, wherein the processor is further configured to minimize a magnitude of draft of the SWM by excluding point clouds far away from the GNSS receiver, such that the 3D point clouds are inside a sliding window.

15. The system of claim 13, wherein the processor is configured to obtain a local map based on the 3D point clouds from the 3D LiDAR sensor; and adopts an orientation from the AHRS to transform the SWM from a body frame to a local East North Up (ENU) frame.

16. The system of claim 13, wherein the processor is configured to use a fast-searching method to detect the NLOS reception from the GNSS measurements, wherein the fast-searching method comprises:
   initializing a search point at a center of the 3D LiDAR sensor;
   determining a search direction connecting the GNSS receiver and a satellite based on an elevation angle and an azimuth angle of the satellite;
   moving the search point along the search direction with a fixed incremental value $\Delta d_{pix}$;
   counting a number of neighboring points ($N_k$) near the search point; and
   classifying the search point as an NLOS satellite if $N_k$ exceeds a predetermined threshold $N_{thres}$.

17. The system of claim 13, wherein the processor is further configured to correct the NLOS reception by re-estimating the GNSS measurement using a model calibration based on the SWM, wherein the SWM provides the 3D point clouds that are dense, discrete, and unorganized without continuous building surfaces or boundaries.

18. The system of claim 17, wherein the model calibration comprises:
   detecting a reflection point corresponding to the NLOS reception using an efficient kdTree structure based on a reflector detection algorithm, wherein the reflector detection algorithm comprises:
      traversing all the azimuths from 0° to 360° with an azimuth resolution of $\alpha_{res}$ and an elevation angle of $\epsilon_{r,t}^{s}$;
      detecting a potential reflector when a line-of-sight connecting the point $p_j$ and a satellite is not blocked; and
      detecting a unique reflector with a shortest distance between the GNSS receiver and the potential reflectors.

19. The system of claim 13, wherein the processor is configured to perform the NLOS remodeling using a weighting scheme with a scaling factor, wherein the scaling factor is used to de-weight the NLOS reception, wherein the weighting scheme comprises a determination that:
   if a satellite is classified as a LOS measurement, the scaling factor is calculated based on a satellite signal to noise ratio (SNR) and an elevation angle;
   if the satellite is classified as an NLOS measurement and a pseudorange error is corrected, the scaling factor is calculated based on the satellite SNR and the elevation angle; and
   if the satellite is classified as an NLOS measurement but the reflection point is not detected, the scaling factor is calculated based on the satellite SNR, the elevation angle, and a scaling factor $K_w$.

20. The system of claim 13 further comprising:
   an autonomous control for controlling the vehicle based on the GNSS positioning, thereby various functions for intelligent transportation systems are realized;
   an user interface for activating or deactivating the autonomous control; and
   a communication interface.

\* \* \* \* \*